US008893725B2

(12) United States Patent
Dube et al.

(10) Patent No.: US 8,893,725 B2
(45) Date of Patent: Nov. 25, 2014

(54) POLYMERIC MATERIALS DERIVED FROM TOBACCO

(75) Inventors: Michael Francis Dube, Winston-Salem, NC (US); William Monroe Coleman, III, Winston-Salem, NC (US)

(73) Assignee: R. J. Reynolds Tobacco Company, Winston-Salem, NC (US)

( * ) Notice: Subject to any disclaimer, the term of this patent is extended or adjusted under 35 U.S.C. 154(b) by 973 days.

(21) Appl. No.: 13/015,912

(22) Filed: Jan. 28, 2011

(65) Prior Publication Data
US 2012/0192882 A1    Aug. 2, 2012

(51) Int. Cl.
| | | |
|---|---|---|
| A24D 1/02 | (2006.01) |
| A24D 3/08 | (2006.01) |
| A24B 15/10 | (2006.01) |
| C08F 2/00 | (2006.01) |
| C08F 4/06 | (2006.01) |
| C08F 4/32 | (2006.01) |
| C08F 4/42 | (2006.01) |
| C08F 4/642 | (2006.01) |
| C08F 136/06 | (2006.01) |
| A24D 3/06 | (2006.01) |
| A24B 15/24 | (2006.01) |
| A24B 15/30 | (2006.01) |
| C08F 36/04 | (2006.01) |
| C08L 9/00 | (2006.01) |

(52) U.S. Cl.
CPC ... *C08L 9/00* (2013.01); *A24D 3/06* (2013.01); *A24D 3/08* (2013.01); *A24B 15/24* (2013.01); *A24B 15/302* (2013.01); *C08F 36/045* (2013.01)
USPC ........... 131/273; 131/332; 131/347; 131/352; 522/186; 522/187; 525/331.9; 525/332.6; 526/185; 526/218.1; 526/335; 526/340.4; 526/159

(58) Field of Classification Search
USPC ................. 131/270, 273, 331, 332, 347, 352; 522/184, 186, 187; 525/326.1, 331.9, 525/332.5, 332.6; 526/72, 77, 89, 107, 159, 526/160, 183, 185, 218.1, 227, 335, 340.4
See application file for complete search history.

(56) References Cited

U.S. PATENT DOCUMENTS

| 2,966,157 A | 12/1960 | Touey et al. |
| 3,047,559 A | 7/1962 | Mayor et al. |

(Continued)

FOREIGN PATENT DOCUMENTS

| CN | 101940361 | 1/2011 |
| DE | 10243618 | 6/2003 |

(Continued)

OTHER PUBLICATIONS

Radulović et al., Chemical Composition of the Ether and Ethyl Acetate Extracts of Serbian Selected Tobacco Types: *J. Essential Oil Res.*, 2006, vol. 18:5, pp. 562-565.

(Continued)

*Primary Examiner* — Dennis Cordray
(74) *Attorney, Agent, or Firm* — Womble Carlyle Sandridge & Rice, LLP

(57) ABSTRACT

The invention provides a polymer prepared from a substituted 1,3-butadiene (such as neophytadiene) derived from a plant of the *Nicotiana* species. The invention also provides smoking articles and smokeless tobacco compositions that include the polymers described herein. Further, the invention provides a method of polymerizing a substituted 1,3-butadiene derived from a plant of the *Nicotiana* species, the method including reacting a substituted 1,3-butadiene derived from a plant of the *Nicotiana* species with one or more reagents selected from the group consisting of an anionic initiator, a radical initiator, and a Ziegler-Natta catalyst.

29 Claims, 2 Drawing Sheets

(56) References Cited

U.S. PATENT DOCUMENTS

| | | |
|---|---|---|
| 3,114,743 A | 12/1963 | Horne, Jr. |
| 3,135,725 A | 6/1964 | Carlson et al. |
| 3,140,278 A | 7/1964 | Kuntz |
| 3,268,500 A | 8/1966 | Royston |
| 3,393,120 A | 7/1968 | Touey |
| 3,646,231 A | 2/1972 | Kamienski et al. |
| 3,741,927 A | 6/1973 | Nordsiek et al. |
| 3,822,219 A | 7/1974 | Kamienski et al. |
| 3,846,385 A | 11/1974 | Hargis et al. |
| 3,880,173 A | 4/1975 | Hill |
| 3,887,536 A | 6/1975 | Ichikawa et al. |
| 3,900,456 A | 8/1975 | Naylor |
| 3,979,372 A | 9/1976 | Van Der Bend et al. |
| 3,992,561 A | 11/1976 | Hargis et al. |
| 4,076,255 A | 2/1978 | Moore et al. |
| 4,111,499 A | 9/1978 | McCloskey |
| 4,144,895 A | 3/1979 | Fiore |
| 4,150,677 A | 4/1979 | Osborne, Jr. et al. |
| 4,224,426 A | 9/1980 | Odar |
| 4,255,690 A | 3/1981 | Lecornet |
| 4,289,147 A | 9/1981 | Wildman et al. |
| 4,295,991 A | 10/1981 | Wristers |
| 4,359,059 A | 11/1982 | Brummer et al. |
| 4,383,097 A | 5/1983 | Castner et al. |
| 4,433,100 A * | 2/1984 | Laurito ................... 525/54.42 |
| 4,506,682 A | 3/1985 | Muller |
| 4,589,428 A | 5/1986 | Keritsis |
| 4,605,016 A | 8/1986 | Soga et al. |
| 4,632,912 A | 12/1986 | Bedell et al. |
| 4,727,889 A | 3/1988 | Niven, Jr. et al. |
| 4,729,391 A | 3/1988 | Woods et al. |
| 4,795,778 A | 1/1989 | Bond et al. |
| 4,800,903 A | 1/1989 | Ray et al. |
| 4,873,291 A | 10/1989 | Cohen et al. |
| 4,887,618 A | 12/1989 | Bernasek et al. |
| 4,904,725 A | 2/1990 | Himes |
| 4,907,605 A | 3/1990 | Ray et al. |
| 4,931,376 A | 6/1990 | Ikematsu |
| 4,941,484 A | 7/1990 | Clapp et al. |
| 4,955,613 A | 9/1990 | Gendreau et al. |
| 4,967,771 A | 11/1990 | Fagg et al. |
| 4,986,286 A | 1/1991 | Roberts et al. |
| 5,005,593 A | 4/1991 | Fagg et al. |
| 5,018,540 A | 5/1991 | Grubbs et al. |
| 5,025,815 A | 6/1991 | Hill et al. |
| 5,032,560 A | 7/1991 | Bailly et al. |
| 5,037,912 A | 8/1991 | Patterson et al. |
| 5,060,669 A | 10/1991 | White et al. |
| 5,064,918 A | 11/1991 | Malanga |
| 5,065,775 A | 11/1991 | Fagg |
| 5,074,319 A | 12/1991 | White et al. |
| 5,099,862 A | 3/1992 | White et al. |
| 5,121,757 A | 6/1992 | White et al. |
| 5,131,415 A | 7/1992 | Munoz et al. |
| 5,137,996 A | 8/1992 | Bailly et al. |
| 5,197,494 A | 3/1993 | Kramer |
| 5,230,354 A | 7/1993 | Smith et al. |
| 5,234,008 A | 8/1993 | Fagg |
| 5,243,999 A | 9/1993 | Smith |
| 5,301,694 A | 4/1994 | Raymond et al. |
| 5,306,740 A | 4/1994 | Laas et al. |
| 5,318,050 A | 6/1994 | Gonzalez-Parra et al. |
| 5,324,800 A | 6/1994 | Welborn et al. |
| 5,343,879 A | 9/1994 | Teague |
| 5,350,723 A | 9/1994 | Neithamer |
| 5,360,022 A | 11/1994 | Newton |
| 5,399,635 A | 3/1995 | Neithamer |
| 5,435,325 A | 7/1995 | Clapp et al. |
| 5,445,169 A | 8/1995 | Brinkley et al. |
| 5,453,410 A | 9/1995 | Kolthammer |
| 5,540,983 A | 7/1996 | Maris et al. |
| 5,596,053 A | 1/1997 | Kang et al. |
| 5,691,429 A | 11/1997 | Van Der Arend et al. |
| 5,747,407 A | 5/1998 | Martin |
| 6,131,584 A | 10/2000 | Lauterbach |
| 6,291,374 B1 | 9/2001 | Landi |
| 6,298,859 B1 | 10/2001 | Kierulff et al. |
| 6,486,258 B1 | 11/2002 | Noguchi et al. |
| 6,579,998 B2 | 6/2003 | Sita et al. |
| 6,591,841 B1 | 7/2003 | White et al. |
| 6,730,753 B2 | 5/2004 | Fottinger et al. |
| 6,887,956 B2 | 5/2005 | Van der Huizen et al. |
| 7,015,169 B2 | 3/2006 | Fottinger et al. |
| 7,456,126 B2 | 11/2008 | Kim et al. |
| 7,819,124 B2 | 10/2010 | Strickland et al. |
| 7,851,644 B2 | 12/2010 | Ewen et al. |
| 2006/0283469 A1* | 12/2006 | Lipowicz ...................... 131/352 |
| 2008/0254149 A1 | 10/2008 | Havkin-Frenkel |
| 2010/0163062 A1 | 7/2010 | Atchley et al. |
| 2012/0211015 A1* | 8/2012 | Li et al. ......................... 131/273 |
| 2012/0272976 A1* | 11/2012 | Byrd et al. .................... 131/275 |

FOREIGN PATENT DOCUMENTS

| | | |
|---|---|---|
| EP | 0 176 280 | 4/1986 |
| WO | WO 94/12450 | 6/1994 |

OTHER PUBLICATIONS

Ishikawa et al., "Water-Soluble Constituents of Dill", *Chem. Pharm. Bull.*, 2002, pp. 501-507, vol. 50., No. 4.

Tienpont et al., "Stir Bar Sorptive Extraction-Thermal Desorption-Capillary GC-MS Applied to Biological Fluids", *Anal. Bioanal. Chem..*, 2002, pp. 46-55, vol. 373.

Coleman, III et al., "Headspace Solid-Phase Microextraction Analysis of Artificial Flavors", *J. Sci. Food Agric.*, 2005, pp. 2645-2654, vol. 85.

Coleman, III et al., "The Use of a Non-Equilibrated Solid Phase Microextraction Method to Quantitatively Determine the Off-Notes in Mint and Other Essential Oils", *J. Sci. Food Agric.*, 2004, pp. 1223-1228, vol. 84.

Sahraoui et al., "Improved Microwave Steam Distillation Apparatus for Isolation of Essential Oils Comparison with Conventional Steam Distillation", *J. Chromatogr. A.*, 2008, pp. 229-233.

Marconi W. et al. "Stereospecific Polymerization of 2-Substituted-1,3-Butadienes. I. Crystalline Polymers of 2-tert-Butyl-1,3-butadiene" Journal of Polymer Science. 1964 pp. 4261-4270.

Marconi W. et al. "Stereospecific Polymerization of 2-Substituted-1,3-Butadienes. II. Stereospecific Polymers of 2-n-Propyl-1,3-butadiene" Journal of Polymer Science. 1965 pp. 123-129.

Vickers et al. "Isoprene Systhesis Protects Transgenic Tobacco Plants From Oxidative Stress," *Plant, Cell and Environment*, 2009, pp. 520-531, vol. 32/.

* cited by examiner

POLYMERIC MATERIALS DERIVED FROM TOBACCO

FIELD OF THE INVENTION

The present invention relates to products made or derived from tobacco, or that otherwise incorporate tobacco, and are intended for human consumption. Of particular interest are ingredients or components obtained or derived from plants or portions of plants from the *Nicotiana* species.

BACKGROUND OF THE INVENTION

Popular smoking articles, such as cigarettes, have a substantially cylindrical rod shaped structure and include a charge, roll or column of smokable material such as shredded tobacco (e.g., in cut filler form) surrounded by a paper wrapper, thereby forming a so-called "tobacco rod." Normally, a cigarette has a cylindrical filter element aligned in an end-to-end relationship with the tobacco rod. Typically, a filter element comprises plasticized cellulose acetate tow circumscribed by a paper material known as "plug wrap." Certain cigarettes incorporate a filter element having multiple segments, and one of those segments can comprise activated charcoal particles. Typically, the filter element is attached to one end of the tobacco rod using a circumscribing wrapping material known as "tipping paper." It also has become desirable to perforate the tipping material and plug wrap, in order to provide dilution of drawn mainstream smoke with ambient air. A cigarette is employed by a smoker by lighting one end thereof and burning the tobacco rod. The smoker then receives mainstream smoke into his/her mouth by drawing on the opposite end (e.g., the filter end) of the cigarette.

The tobacco used for cigarette manufacture is typically used in blended form. For example, certain popular tobacco blends, commonly referred to as "American blends," comprise mixtures of flue-cured tobacco, burley tobacco and Oriental tobacco, and in many cases, certain processed tobaccos, such as reconstituted tobacco and processed tobacco stems. The precise amount of each type of tobacco within a tobacco blend used for the manufacture of a particular cigarette brand varies from brand to brand. However, for many tobacco blends, flue-cured tobacco makes up a relatively large proportion of the blend, while Oriental tobacco makes up a relatively small proportion of the blend. See, for example, *Tobacco Encyclopedia*, Voges (Ed.) p. 44-45 (1984), Browne, *The Design of Cigarettes*, 3$^{rd}$ Ed., p. 43 (1990) and *Tobacco Production, Chemistry and Technology*, Davis et al. (Eds.) p. 346 (1999).

Tobacco also may be enjoyed in a so-called "smokeless" form. Particularly popular smokeless tobacco products are employed by inserting some form of processed tobacco or tobacco-containing formulation into the mouth of the user. Various types of smokeless tobacco products are set forth in U.S. Pat. No. 1,376,586 to Schwartz; U.S. Pat. No. 3,696,917 to Levi; U.S. Pat. No. 4,513,756 to Pittman et al.; U.S. Pat. No. 4,528,993 to Sensabaugh, Jr. et al.; U.S. Pat. No. 4,624,269 to Story et al.; U.S. Pat. No. 4,987,907 to Townsend; U.S. Pat. No. 5,092,352 to Sprinkle, III et al.; and U.S. Pat. No. 5,387,416 to White et al.; US Pat. Appl. Pub. Nos. 2005/0244521 to Strickland et al.; 2008/0196730 to Engstrom; and 2009/0293889 to Kumar et al.; PCT WO 04/095959 to Arnarp et al.; PCT WO 05/063060 to Atchley et al.; PCT WO 05/016036 to Bjorkholm; and PCT WO 05/041699 to Quinter et al., each of which is incorporated herein by reference. See, for example, the types of smokeless tobacco formulations, ingredients, and processing methodologies set forth in U.S. Pat. Nos. 6,953,040 and 7,032,601 to Atchley et al., each of which is incorporated herein by reference.

Through the years, various additives for tobacco products have been utilized to alter the overall character or nature of tobacco materials in tobacco products. For example, additives have been utilized in order to alter the chemistry or sensory properties of the tobacco material, or in the case of smokable tobacco materials, to alter the chemistry or sensory properties of mainstream smoke generated by smoking articles including the tobacco material. In some cases, additives can be used to impart to a tobacco product a desired color or visual character, desired sensory properties, or a desired physical nature or texture.

It would be desirable to provide methods for altering the character and nature of tobacco products, or packaging thereof, particularly with respect to smoking articles and/or smokeless tobacco products.

SUMMARY OF THE INVENTION

The present invention provides polymers prepared from substituted 1,3-butadienes. In certain embodiments, the substituted 1,3-butadienes are isolated from naturally occurring plants, e.g., plants of the *Nicotiana* species. In some embodiments, the invention provides materials comprising polymerized compounds isolated from *Nicotiana* species (e.g., tobacco-derived materials) useful for incorporation into tobacco compositions utilized in a variety of tobacco products, such as smoking articles and smokeless tobacco products.

In some specific aspects of the invention are provided polymers prepared from neophytadiene (3-methylene-7,11,15-trimethyl-1-hexadecene). In some embodiments, a polymer is provided that is prepared from neophytadiene that has been derived from a plant of the *Nicotiana* species.

In some embodiments, the stereochemistry of the substituents on the polymer chain is controlled. For example, the polymer can comprise greater than about 60% or greater than about 80% cis 1,4-linkages. The polymer can alternatively comprise greater than about 60% trans 1,4-linkages or greater than about 80% trans 1,4-linkages.

The molecular weight of a polymer provided by the present invention can vary. For example, in certain embodiments, a polymer that is prepared from neophytadiene is provided, which has a $M_n$ of between about 20,000 Da and about 500,000 Da. In specific embodiments, the molecular weight distribution within the polymer sample is relatively low. For example, a polymer sample can be provided wherein the polydispersity index of the polymer is less than about 1.5.

In another aspect, the invention provides a tobacco product comprising a polymer prepared from a substituted 1,3-butadiene derived from a plant of the *Nicotiana* species. Exemplary tobacco products include smoking articles and smokeless tobacco products. In one embodiment, the polymer is incorporated into the tobacco product in admixture with a tobacco material. In another embodiment, the polymer is incorporated into a pouch surrounding a smokeless tobacco composition. In yet another embodiment, the tobacco product contains a capsule, and the capsule comprises the polymer of the invention (e.g., as a component of the capsule wall or in admixture with a flavorant inside the capsule). In a still further embodiment, the tobacco product comprises one or more wrapping materials, and the polymer is incorporated into, or coated on a surface of, at least one wrapping material. For example, the polymer could be used in an adhesive composition securing one or more of the wrapping materials or used as part of a lip release coating on the exterior of a tipping material. In another embodiment, the tobacco product is a filtered cigarette comprising a filter element, and the filter element comprises the polymer (e.g., in the form of fibers or as a component of a fibrous material).

In other aspects of the invention are provided methods for the polymerization of substituted 1,3-butadienes. For example, the invention provides methods of polymerizing a substituted 1,3-butadiene derived from a plant of the *Nicotiana* species, comprising reacting a substituted 1,3-butadiene derived from a plant of the *Nicotiana* species with one or more reagents selected from the group consisting of an anionic initiator, a radical initiator, and a Ziegler-Natta catalyst. The method by which the substituted 1,3-butadiene is polymerized can vary. For example, the substituted 1,3-butadiene can be polymerized via anionic, radical, or coordination polymerization. In certain embodiments, the polymerizing comprises reacting neophytadiene with one or more anionic initiators, which can comprise a lithium-based compound (e.g., n-butyl lithium). In certain embodiments, the polymerizing comprises reacting neophytadiene with one or more radical initiators, which can comprise a reagent selected from the group consisting of a peroxide, an azo compound, and a persulfate. The radical initiator can be activated by, for example, heat, photolysis, a reduction-oxidation reaction, dissociation, or ionizing radiation. In certain embodiments, the polymerizing comprises reacting neophytadiene with a catalyst comprising a Ziegler-Natta catalyst. In some embodiments, the Ziegler-Natta catalyst comprises a titanium compound (e.g., titanium (IV) chloride or titanium (III) chloride) and an aluminum compound (e.g., a dialkyl aluminum hydride, a dialkyl aluminum halide, or a trialkyl aluminum compound). Specifically, the aluminum compound may comprise triethyl aluminum, diethyl aluminum hydride diethyl aluminum chloride, or diisobutylaluminum chloride.

In certain embodiments, the method of polymerizing a substituted 1,3-butadiene further comprises cross-linking the polymerized substituted 1,3-butadiene. Such cross linking can, for example, comprise reacting polymerized neophytadiene with a vulcanizing agent comprising sulfur.

In one aspect, the methods of the invention further include the step of isolating an extract containing the substituted 1,3-butadiene from a plant of the *Nicotiana* species using, for example, the extraction techniques described herein.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION OF THE PREFERRED EMBODIMENTS

Figure 1:
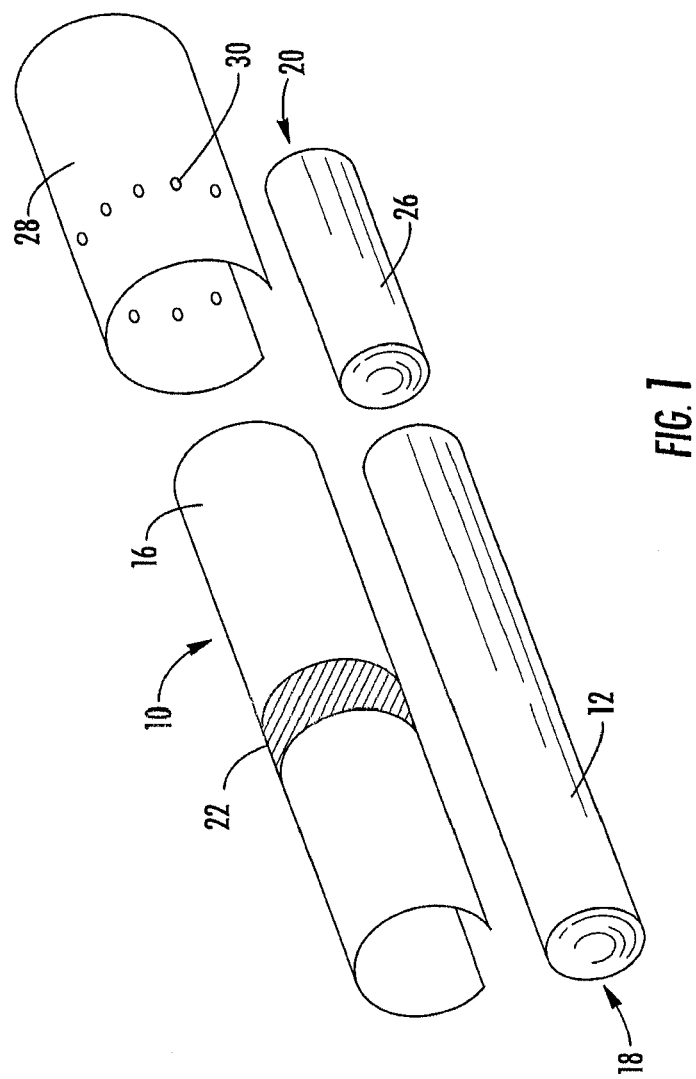
FIG. 1 is an exploded perspective view of a smoking article having the form of a cigarette, showing the smokable material, the wrapping material components, and the filter element of the cigarette.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise. Reference to "dry weight percent" or "dry weight basis" refers to weight on the basis of dry ingredients (i.e., all ingredients except water).

Substituted 1,3-butadiene refers to any compound having the following structure:

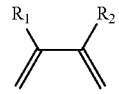

wherein $R_1$ and $R_2$ are independently selected from H and optionally substituted alkyl chains (e.g., C1-20 alkyl chains), and wherein at least one or $R_1$ and $R_2$ is not H. Alkyl as used herein means saturated, straight, branched, or cyclic hydrocarbon groups. The alkyl chains can be optionally substituted with, for example, C1-6 alkyl, C1-6 alkoxy, halo (e.g., Cl, F, Br, and I); halogenated alkyl (e.g., $CF_3$, 2-Br-ethyl, $CH_2F$, $CH_2Cl$, $CH_2CF_3$, or $CF_2CF_3$); hydroxyl; amino; carboxylate; carboxamido; alkylamino; arylamino; alkoxy; aryloxy; nitro; azido; cyano; thio; sulfonic acid; sulfate; phosphonic acid; phosphate; and/or phosphonate groups.

The substituted 1,3-butadiene can be obtained from any source. In certain preferred embodiments, the substituted 1,3-butadiene is obtained or derived from one or more parts of a plant (e.g., the root, stem, leaves, and/or flower of the plant). The description provided herein focuses on the isolation of substituted 1,3-butadienes from plants of the *Nicotiana* species; however, this description is not intended to be limiting. According to the present invention, substituted 1,3-butadienes can be obtained from any natural source or can be synthetically prepared.

In embodiments wherein a substituted 1,3-butadiene is obtained from a plant of the *Nicotiana* species, the selection of the plant from the *Nicotiana* species can vary. Descriptions of various types of tobaccos, growing practices and harvesting practices are set forth in *Tobacco Production, Chemistry and Technology*, Davis et al. (Eds.) (1999), which is incorporated herein by reference. Various representative types of plants from the *Nicotiana* species are set forth in Goodspeed, *The Genus Nicotiana*, (Chonica Botanica) (1954); U.S. Pat. No. 4,660,577 to Sensabaugh, Jr. et al.; U.S. Pat. No. 5,387,416 to White et al. and U.S. Pat. No. 7,025,066 to Lawson et al.; US Pat. Appl. Pub. Nos. 2006/0037623 to Lawrence, Jr. and 2008/0245377 to Marshall et al.; which are incorporated herein by reference. The particular *Nicotiana* species of material used in the invention can vary. Of particular interest are *N. alata, N. arentsii, N. excelsior, N. forgetiana, N. glauca, N. glutinosa, N. gossei, N. kawakamii, N. knightiana, N. langsdorffi, N. otophora, N. setchelli, N. sylvestris, N. tomentosa, N. tomentosiformis, N. undulata,* and *N. x sanderae*. Also of interest are *N. africana, N. amplexicaulis, N. benavidesii, N. bonariensis, N. debneyi, N. longiflora, N. maritina, N. megalosiphon, N. occidentalis, N. paniculata, N. plumbaginifolia, N. raimondii, N. rosulata, N. rustica, N. simulans, N. stocktonii, N. suaveolens, N. tabacum, N. umbratica, N. velutina,* and *N. wigandioides*. Other plants from the *Nicotiana* species include *N. acaulis, N. acuminata, N. attenuata, N. benthamiana, N. cavicola, N. clevelandii, N. cordifolia, N. corymbosa, N. fragrans, N. goodspeedii, N. linearis, N. miersii, N. nudi-*

*caulis, N. obtusifolia, N. occidentalis* subsp. *Herperis, N. pauciflora, N. petunioides, N. quadrivalvis, N. repanda, N. rotundifolia, N. solanifolia* and *N. spegazzinii*.

The *Nicotiana* species can be derived using genetic-modification or crossbreeding techniques (e.g., tobacco plants can be genetically engineered or crossbred to increase or decrease production of components, characteristics or attributes). See, for example, the types of genetic modifications of plants set forth in U.S. Pat. No. 5,539,093 to Fitzmaurice et al.; U.S. Pat. No. 5,668,295 to Wahab et al.; U.S. Pat. No. 5,705,624 to Fitzmaurice et al.; U.S. Pat. No. 5,844,119 to Weigl; U.S. Pat. No. 6,730,832 to Dominguez et al.; U.S. Pat. No. 7,173,170 to Liu et al.; U.S. Pat. No. 7,208,659 to Colliver et al. and U.S. Pat. No. 7,230,160 to Benning et al.; US Pat. Appl. Pub. No. 2006/0236434 to Conkling et al.; and PCT WO 2008/103935 to Nielsen et al., which are all incorporated herein by reference.

At least a portion of the plant of the *Nicotiana* species can be employed in an immature form. That is, the plant, or at least one portion of that plant, can be harvested before reaching a stage normally regarded as ripe or mature. As such, for example, tobacco can be harvested when the tobacco plant is at the point of a sprout, is commencing leaf formation, is commencing flowering, or the like. At least a portion of the plant of the *Nicotiana* species can be employed in a mature form. That is, the plant, or at least one portion of that plant, can be harvested when that plant (or plant portion) reaches a point that is traditionally viewed as being ripe, over-ripe or mature. As such, for example, through the use of tobacco harvesting techniques conventionally employed by farmers, Oriental tobacco plants can be harvested, burley tobacco plants can be harvested, or Virginia tobacco leaves can be harvested or primed by stalk position.

In accordance with the present invention, in one embodiment, one or more substituted 1,3-butadienes are isolated from a component of a plant of at least one *Nicotiana* species. Substituted 1,3-butadienes can be isolated from any component of such a plant. For example, substituted 1,3-butadienes can be isolated from the leaf, stem, stalk, roots, and/or flower of the plant.

Tobacco plants can be grown under conditions designed to maximize the 1,3-butadiene content. For example, selection of fertilizer can impact the content of substituted 1,3-butadiene in the plant. Tobacco plants can be grown in greenhouses, growth chambers, or outdoors in fields, or grown hydroponically.

In one embodiment, one or more substituted 1,3-butadienes are isolated from a plant of the *Nicotiana* species. The substituted 1,3-butadienes can be isolated from the plant by any means. For example, certain compounds or mixtures thereof are commonly isolated from plants by one or more process steps (e.g., solvent extraction using polar solvents, organic solvents, or supercritical fluids), chromatography, distillation, filtration, recrystallization, and/or solvent-solvent partitioning. Exemplary extraction and separation solvents or carriers include water, alcohols (e.g., methanol or ethanol), hydrocarbons (e.g., heptane and hexane), diethyl ether, methylene chloride and supercritical carbon dioxide. Exemplary techniques useful for extracting components from *Nicotiana* species are described in U.S. Pat. No. 4,144,895 to Fiore; U.S. Pat. No. 4,150,677 to Osborne, Jr. et al.; U.S. Pat. No. 4,267,847 to Reid; U.S. Pat. No. 4,289,147 to Wildman et al.; U.S. Pat. No. 4,351,346 to Brummer et al.; U.S. Pat. No. 4,359,059 to Brummer et al.; U.S. Pat. No. 4,506,682 to Muller; U.S. Pat. No. 4,589,428 to Keritsis; U.S. Pat. No. 4,605,016 to Soga et al.; U.S. Pat. No. 4,716,911 to Poulose et al.; U.S. Pat. No. 4,727,889 to Niven, Jr. et al.; U.S. Pat. No. 4,887,618 to Bernasek et al.; U.S. Pat. No. 4,941,484 to Clapp et al.; U.S. Pat. No. 4,967,771 to Fagg et al.; U.S. Pat. No. 4,986,286 to Roberts et al.; U.S. Pat. No. 5,005,593 to Fagg et al.; U.S. Pat. No. 5,018,540 to Grubbs et al.; U.S. Pat. No. 5,060,669 to White et al.; U.S. Pat. No. 5,065,775 to Fagg; U.S. Pat. No. 5,074,319 to White et al.; U.S. Pat. No. 5,099,862 to White et al.; U.S. Pat. No. 5,121,757 to White et al.; U.S. Pat. No. 5,131,414 to Fagg; U.S. Pat. No. 5,131,415 to Munoz et al.; U.S. Pat. No. 5,148,819 to Fagg; U.S. Pat. No. 5,197,494 to Kramer; U.S. Pat. No. 5,230,354 to Smith et al.; U.S. Pat. No. 5,234,008 to Fagg; U.S. Pat. No. 5,243,999 to Smith; U.S. Pat. No. 5,301,694 to Raymond et al.; U.S. Pat. No. 5,318,050 to Gonzalez-Parra et al.; U.S. Pat. No. 5,343,879 to Teague; U.S. Pat. No. 5,360,022 to Newton; U.S. Pat. No. 5,435,325 to Clapp et al.; U.S. Pat. No. 5,445,169 to Brinkley et al.; U.S. Pat. No. 6,131,584 to Lauterbach; U.S. Pat. No. 6,298,859 to Kierulff et al.; U.S. Pat. No. 6,772,767 to Mua et al.; and U.S. Pat. No. 7,337,782 to Thompson, all of which are incorporated herein by reference. See also, the types of separation techniques set forth in Brandt et al., *LC-GC Europe*, p. 2-5 (March, 2002) and Wellings, *A Practical Handbook of Preparative HPLC* (2006), which are incorporated herein by reference.

The separation process used to isolate certain compounds from plants of the *Nicotiana* species could further involve the types of treatments set forth in Ishikawa et al., *Chem. Pharm. Bull.*, 50, 501-507 (2002); Tienpont et al., *Anal. Bioanal. Chem.*, 373, 46-55 (2002); Ochiai, *Gerstel Solutions Worldwide*, 6, 17-19 (2006); Coleman, III, et al., *J Sci. Food and Agric.*, 84, 1223-1228 (2004); Coleman, III et al., *J. Sci. Food and Agric.*, 85, 2645-2654 (2005); Pawliszyn, ed., *Applications of Solid Phase Microextraction, RSC Chromatography Monographs*, (Royal Society of Chemistry, UK) (1999); Sahraoui et al., *J. Chrom.*, 1210, 229-233 (2008); and U.S. Pat. No. 5,301,694 to Raymond et al., which are incorporated herein by reference.

In particular, in certain embodiments, the plant of the *Nicotiana* species is subjected to a distillation process typically applied in the preparation of essential oils. See, for example, Engineers India Res. Inst., Essential Oils Processes and Formulations Handbook, 2003, which is incorporated herein by reference.

In one certain embodiment, substituted 1,3-butadienes are isolated from a plant of the *Nicotiana* species by a dry steam distillation process. Typically in dry steam distillation, dry (anhydrous) steam is passed through the material (here, the plant of the *Nicotiana* species). The steam condenses to produce a condensate comprising a water layer and an oily layer, which can be separated. The oily layer, which typically comprises one or more substituted 1,3-butadienes, can be used as the source of the one or more substituted 1,3-butadienes according to the present invention.

In some embodiments, one or more substituted 1,3-butadienes can be isolated from the waste stream collected during the distillation process. Waste water from the steam distillation process can be processed to afford a sample containing one or more substituted 1,3-butadienes. For example, the waste water component is concentrated to remove the water, and one or more organic solvents are added to dissolve any remaining compounds. Any organic solvent capable of dissolving one or more substituted 1,3-butadienes that may be present in the wastewater can be used for this purpose (including, but not limited to, hexanes, methyl-t-butyl ether (MTBE), and/or methanol). The organic solvents are removed to give a mixture that can comprise one or more substituted 1,3-butadienes.

The substituted 1,3-butadienes can be separated from one another, or otherwise fractionated into chemical classes or mixtures of individual compounds. Because the product isolated from a plant of the *Nicotiana* species can comprise multiple compounds, the isolated product can be further processed using one or more of the extraction techniques provided in the references noted above (e.g., various chromatography methods) to further isolate one or more substituted 1,3-butadienes for subjection to the polymerization processes described herein.

In certain embodiments, the substituted 1,3-butadiene is provided in relatively pure form. For example, polymerization can be conducted on a pure sample of a substituted 1,3-butadiene (e.g., greater than about 85%, greater than about 90%, greater than about 95%, greater than about 98%, or greater than about 99% by weight of said substituted 1,3-butadiene) or can be conducted on a sample comprising a substituted 1,3-butadiene and one or more additional compounds (e.g., one or more additional substituted 1,3-butadienes) isolated from a plant of the *Nicotiana* species. In certain embodiments, the polymerization may be conducted on an isolated mixture of phytadienes comprising neophytadiene.

In one preferred embodiment, the substituted 1,3-butadiene is neophytadiene, wherein $R_1=H$ and $R_2=(CH_2)_3CH(CH_3)(CH_2)_3CH(CH_3)(CH_2)_3CH(CH_3)_2$, as shown below.

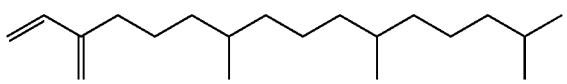 [SMILES: C=CC(=C)CCCC(C)CCCC(C)CCCC(C)C]

Although the application focuses on neophytadiene, other substituted 1,3-butadienes are typically present in plants of the *Nicotiana* species and may be subjected to polymerization as described herein. For example, other compounds containing a 1,3-diene functionality that have been reported to be present in tobacco and/or tobacco smoke are reported in Rodgman et al., The Chemical Components of Tobacco and Tobacco Smoke, CRC Press (2009), which is incorporated herein by reference. In addition, heating neophytadiene may form additional substituted 1,3-butadienes, which are also intended to be encompassed within the method of the present invention as described herein.

In certain embodiments, the substituted 1,3-butadiene, e.g., neophytadiene, is isolated from one or more parts of a plant from the *Nicotiana* species as described above. For example, neophytadiene has been isolated from certain tobacco types by extraction with supercritical $CO_2$, diethyl ether, or ethyl acetate. See Niko et al., Chemical Composition of the Ether and Ethyl Acetate Extracts of Serbian Selected Tobacco Types: Yaka, Prilep and Otlj a, *J. Essential Oil Res.* 18 (5): 562-565 (2006), which is incorporated herein by reference. However, neophytadiene from any source can be used. In some embodiments, neophytadiene can be recovered from other plants, e.g., by distillation of essential oils therefrom. See US Pat. Appl. Pub. No. 2008/0254149 to Havkin-Frenkel et al., which is incorporated herein by reference. Some specific plants from which neophytadiene can be recovered include, but are not limited to, algae (see Plaza et al., *J. Pharm. Biomed. Anal.* (2009)), *Acalpha segetalis* (see Aboaba et al., *Nat. Prod. Commun.* 5 (3):481-3 (2010)), and *Elaphoglossum Spathulatum* (see Socolsky et al., *ARKIVOC* 347-355 (2003)), which are incorporated herein by reference. Neophytadiene has also been found in subcutaneous fat of pigs (see Tejeda et al., Options Mediterraneennes, Series A, No. 76), and in beef fat (Watanabe et al., J. Food Sci., 73 (5): C420-C425 (2008)), which are both incorporated herein by reference.

The substituted 1,3-butadiene (isolated from a natural source or synthetically prepared) can be polymerized by any method known for the polymerization of 1,3-butadienes. However, the methods known for polymerization of 1,3-butadiene may require some degree of modification, as the presence of bulky substituents on butadiene is known to affect the polymerization behavior. See Marconi et al., Stereospecific Polymerization of 2-substituted 1,3-butadienes. I. Crystalline Polymers of 2-tert-butyl-1,3-butadiene, *J. Poly. Sci. Part A.*, 2 (10): 4261-4270 (1964); and Marconi et al., Stereospecific Polymerization of 2-substituted 1,3-butadienes. II. Stereospecific Polymers of 2-n-Propyl-1,3-butadiene, *J. Poly. Sci. Part A.*, 3 (1): 123-129 (1965), which are both incorporated herein by reference. For example, parameters such as reaction time, solvent, catalyst/initiator, and concentration of reagents may need to be adjusted to achieve satisfactory polymerization of the monomer. Neophytadiene will be used herein as an example; however, the invention is applicable to a wide range of substituted 1,3-butadienes. Reaction conditions (e.g., selection of initiator, catalyst, solvent, temperature, and/or reaction time) can be adjusted accordingly to accommodate the properties of the particular substituted 1,3-butadiene or mixture thereof to be polymerized.

In some embodiments, neophytadiene is polymerized by anionic polymerization. Typically in anionic polymerization, the 1,3-butadiene monomer is combined with an initiator, which acts as a nucleophile toward the monomer and reacts with the monomer (initiation). "Anionic initiator" as used herein refers to any reagent capable of functioning as a nucleophile in the reaction mixture. The selection of the anionic initiator can depend, in part, on the stabilization of the propagating anion in the reaction. For example, if the propagating anion is not very strongly stabilized, a powerful nucleophile is required to initiate the reaction. However, if the propagating anion is strongly stabilized, a weak nucleophile is typically sufficient to initiate the reaction.

For example, anionic polymerizations commonly employ anionic initiators comprising alkali metal complexes (e.g., organo lithium reagents, such as butyllithium, sec-butyl lithium, ethyllithium, n-propyllithium, 2-napthyllithium, and/or 4-butylphenyllithium). In certain embodiments, organo lithium reagents are used in combination with one or more additional catalysts (e.g., alkali metal compounds based on Cs, Rb, K, and/or Na; and/or alkaline earth metal complexes based on Mg and/or Ba). See, for example, U.S. Pat. Nos. 3,646,231 and 3,822,219 to Kamienski et al.; U.S. Pat. No. 3,992,561 to Hargis et al.; U.S. Pat. No. 4,225,690 to Halasa et al.; and U.S. Pat. No. 5,037,912 to Patterson et al., which are all incorporated herein by reference. In certain embodiments, anionic initiators comprise Mg-based complexes that, in some embodiments, can be used in combination with one or more additional components (e.g., Ba or K compounds). See, for example, U.S. Pat. No. 3,846,385 to Hargis et al., which is incorporated herein by reference. In certain embodiments, anionic initiators useful according to the present invention comprise covalent or ionic metal amides, alkoxides, hydroxides, cyanides, phosphines, amines, and/or organometallic compounds, including Grignard reagents.

Anionic polymerizations typically must be terminated to stop chain propagation. The compound added to terminate the polymerization can be any compound or compounds sufficient to stop propagation of the polymer. For example, water, alcohol, molecular oxygen, carbon dioxide, or mixtures thereof can be introduced to terminate the polymerization reaction.

In some embodiments, neophytadiene is polymerized by free radical polymerization. Generally, in free radical polymerization, a free radical species is formed, the radical attacks the monomer, and the electron migrates to the chain end, which can subsequently attack another monomer, allowing for chain propagation. Free radical polymerization typically employs a radical initiator, monomer, and, in some reactions, one or more catalysts.

The term "radical initiator" as used herein refers to any molecule capable of reacting to form one or more free radicals, used to initiate and/or sustain the polymerization. A radical initiator can comprise, for example, an organic peroxide (e.g., hydrogen peroxide, benzoyl peroxide, dicumyl peroxide, methyl ethyl ketone peroxide, or various alkyl hydrogen peroxides), an azo compound (e.g., 2,2'-azo-bis-isobutyrylnitrile (AIBN)), a persulfate, a metal iodide, a metal alkyl and/or an alkyl halide. The radical initiator can be activated by any method capable of producing one or more free radicals therefrom. For example, the radical initiator can be activated via the addition of heat, via photolysis, via a reduction-oxidation reaction (e.g., reduction of hydrogen peroxide by a reductant such as $Fe^{2+}$, $Cr^{2+}$, $V^{2+}$, $Ti^{3+}$, $Co^{2+}$, or $Cu^+$), via dissociation (e.g., dissociation of a persulfate in aqueous solution); via ionizing radiation (e.g., α, β, γ, or s-rays), or via electrolysis (e.g., wherein both monomer and electrolyte radical initiator are combined in solution, the monomer can receive an electron at the cathode and the monomer can give up an electrode at the anode to form a radical).

In a radical polymerization, radicals are typically generated throughout the polymerization reaction by decomposition of the radical initiator at a suitable rate to sustain the polymerization. Therefore, in certain embodiments, radical polymerizations are conducted without any added catalyst. However, in some embodiments, one or more catalysts can be used. Catalysts can be desirable, for example, to control the propagation of the growing polymer throughout the course of reaction to manipulate the stereochemistry of the polymer and/or the polydispersity index (PDI) of the polymer.

Numerous catalysts and catalyst systems for radical polymerization of such compounds have been previously described and can be used according to the method provided herein. For example, catalysts are typically used in radical polymerizations conducted in a more controlled fashion. In certain embodiments, more controlled methods of radical polymerization can be used, such as atom transfer radical polymerization (ATRP), reversible addition-fragmentation chain transfer polymerization (RAFT), or stable free radical polymerization (SFRP). Exemplary ATRP catalysts include, but are not limited to transition metal catalysts (e.g., copper complexes), commonly used in combination with alkyl halide initiators. Exemplary RAFT catalysts are chain transfer agents (also called "RAFT" agents), including but not limited to, thiocarbonylthio compounds (e.g., dithioesters, dithiocarbamates, trithiocarbonates, and xanthates). Exemplary SFRP catalysts include, but are not limited to, stable free radicals (e.g., 2,2,6,6-tetramethyl-1-piperidinyloxy (TEMPO) and 4-hydroxy TEMPO).

In some embodiments, neophytadiene is polymerized by addition/coordination polymerization. Coordination polymerization typically requires the use of one or more metal complexes, which facilitate the insertion of monomer units into a bond formed between the metal and the monomer. For example, in certain embodiments, a catalyst useful according to the present invention can comprise one or more transition metal complexes (e.g., Fe, Mb, Cr, Ti, V, La, Nd, Ni, and/or Co complexes). In some embodiments, the catalyst comprises a rare earth metal complex. See Jenkins, Polymer, 26, 147 (1985), which is incorporated herein by reference. In some embodiments, the catalyst comprises a metallocene-based compound or a derivative thereof (e.g., a so-called "constrained geometry catalyst," in which one of the cyclopentadienyl groups has been replaced by a heteroatom ligand, such as an amino or phosphino anion). Such catalysts are described, for example, in U.S. Pat. No. 5,324,800 to Welborn et al. (metallocene compounds); U.S. Pat. No. 5,453,410 to Kolthammer; U.S. Pat. No. 5,399,635 and U.S. Pat. No. 5,350,723 to Neithamer; and U.S. Pat. No. 7,851,644 to Ewen et al. (constrained geometry catalysts), which are all incorporated herein by reference.

In some such embodiments, Ziegler-Natta catalysts are used for the polymerization of a substituted 1,3-butadiene. Ziegler-Natta catalysts include compounds and mixtures thereof that can be used to facilitate the coordination polymerization of olefins and that may do so in a somewhat regular and/or stereoselective manner. See J. Boor Jr., "Ziegler-Natta Catalysts and Polymerizations", Academic Press, New York (1979), which is incorporated herein by reference. In some embodiments, Ziegler-Natta catalysts comprise one or more transition metal complexes in combination with one or more co-catalysts. For example, titanium, nickel, vanadium, and/or cobalt complexes are commonly used as the transition metal complex. In certain embodiments, the co-catalyst comprises a Lewis Acid (e.g., an organoaluminum compound). Exemplary Ziegler-Natta catalyst systems comprise titanium-based catalysts (e.g., titanium (IV) chloride (titanium tetrachloride) or titanium (III) chloride) and aluminum-based co-catalysts (e.g., a trialkyl aluminum compound, a dialkyl aluminum hydride, or a dialkyl aluminum halide, such as triethylaluminum, diethyl aluminum hydride, diethylaluminum chloride, or diisobutylaluminum chloride). Ziegler-Natta type catalysts based on other metals (e.g., transition metals, lanthanides, or actinides) have also been developed and are encompassed within the present invention. Specific Ziegler-Natta catalyst systems have been disclosed, for example, in U.S. Pat. No. 3,047,559 to Mayor et al.; U.S. Pat. No. 3,114,743 to S. E. Home, Jr.; U.S. Pat. No. 3,979,372 to Van Der et al.; U.S. Pat. No. 4,295,991 to Wristers; U.S. Pat. No. 4,632,912 to Bedell et al.; U.S. Pat. No. 5,032,560 to Bailly et al.; U.S. Pat. No. 5,064,918 to Malanga; U.S. Pat. No. 5,137,996 to Bailly et al.; U.S. Pat. No. 5,747,407 to Martin; U.S. Pat. No. 6,579,998 to Sita et al.; U.S. Pat. No. 6,730,753 and U.S. Pat. No. 7,015,169 to Fottinger et al.; and U.S. Pat. No. 7,456,126 to Kim et al., which are all incorporated herein by reference.

Any of the catalysts described herein can be used in combination with one or more co-catalysts. The catalysts can be supported (e.g., on an inorganic oxide such as silica or alumina, on a polymer, on carbon, or on magnesium chloride) or unsupported. The polymerization of substituted 1,3-butadienes according to the present invention can be conducted in solution, emulsion (e.g., a microemulsion, miniemulsion, suspension, dispersion, or inverse microemulsion), or in bulk (i.e., without solution). The selection of solvent, where used, will depend in part on the reactivities and/or solubilities of the components of the reaction mixture. For example, in certain embodiments, suitable solvents comprise pentane, hexane, heptane, octane, isooctane, nonane, cyclohexane, methylcyclohexane, cycloheptane, cyclooctane, tetrahydrofuran, diethyl ether, di-n-propyl ether, di-n-butyl ether, 1,4-dioxane, benzene and/or substituted benzene (e.g., anisole, toluene, xylene, trimethyl benzene, tetramethylbenzene, ethyl benzene, diethyl benzene, triethyl benzene, and n-propylbenzene), halogenated solvents (e.g., methylene chloride, chloroform, chlorobenzene, and 1,2-dichloroethane), water, and mixtures thereof. In certain embodiments, the reaction mixture is kept dry (i.e., water and/or air are essentially excluded therefrom). In some embodiments, additional reagents can be added, for example, to control the stereochemistry and/or to control the molecular weight of the polymer. For example, in certain embodiments, polymerization regulators/polymerization control agents can be added to control the stereochemistry of the resulting polymer. See, for example, U.S. Pat. No. 4,224,426 to Odar and U.S. Pat. No. 5,306,740 to Laas et al., which are incorporated herein by reference.

The concentration of reagents in the polymerization can vary. The monomer concentration can range from about 1% by weight to about 99% by weight. Typically, for a solution polymerization, the monomer concentration is relatively low (e.g., about 1 to about 50% by weight, preferably about 5% to about 25% by weight, and more preferably about 5 to about 10% by weight).

The polymerization reaction can be conducted at any temperature sufficient to allow for chain propagation. One of skill in the art is aware that, for example, varying the reagents may require varying the temperature of the reaction to provide for sufficient chain propagation. One exemplary temperature range is from about 0° C. to about 150° C., although in some embodiments, polymerization can be conducted at temperatures outside this range. In some embodiments, the reaction is conducted between about 0° C. and about 100° C., between about 0° C. and about 50° C., or between about 50° C. and about 100° C. In certain embodiments, the reaction is conducted at room temperature (i.e., about 20° C. to about 25° C.). In some embodiments, the temperature of the reaction is controlled such that it is consistent over the course of the reaction. The time of reaction can vary over a wide range. For example, the reaction time may be as short as a few minutes or may be as long as a few days. In some embodiments, the reaction time may be between about 10 minutes and about 48 hours, for example, between about 10 minutes and about 30 minutes, between about 30 minutes and about 2 hours, between about 2 hours and about 5 hours, between about 5 hours and about 10 hours, between about 10 hours and about 15 hours, between about 15 hours and about 24 hours, between about 24 hours and about 36 hours, or between about 36 hours and about 48 hours.

Monomer units can add to the propagating chain end by means of a 1,2-addition or a 1,4-addition mechanism. In a 1,4-addition, the double bonds formed can have a cis or trans configuration. The percentages of cis and trans double bonds in a polymer formed from substituted 1,3-butadienes according to the present invention can vary. Such percentages can typically be controlled to some extent by temperature and catalyst selection and by concentration of reagents. For example, an organolithium catalyst generally produces polymer having predominantly cis-1,4-linkages of substituted butadienes, but the addition of a Lewis base can increase the percentage of 1,2-butadiene linkages. See, for example, U.S. Pat. No. 3,140,278 to Kuntz, which is incorporated herein by reference. In some embodiments, the catalyst is selected based on its reported ability to stereoselectively catalyze butadiene. For example, certain catalyst systems are reported to produce primarily trans-polybutadiene. See, for example, U.S. Pat. No. 3,268,500 to Royston; U.S. Pat. No. 3,887,536 to Ichikawa et al.; U.S. Pat. No. 4,225,690 to Halasa et al.; U.S. Pat. No. 4,931,376 to Ikematsu; and U.S. Pat. No. 5,596,053 to Kang et al., which are incorporated herein by reference. Other catalyst systems are reported to produce primarily cis-polybutadiene. See, for example, U.S. Pat. No. 3,135,725 to Carlson et al.; U.S. Pat. No. 4,383,097 to Castner et al.; U.S. Pat. No. 5,691,429 to Van Der Arend et al.; and U.S. Pat. No. 6,887,956 to van der Huizen et al., which are incorporated herein by reference.

The polymerization of substituted 1,3-butadienes according to the present invention can be carried out to any degree of conversion. In other words, any percentage of monomer present in the reaction mixture can be incorporated within the polymer produced according to the present invention. The conversion is dependent, for example, on the concentration of monomer, concentration of catalyst, nature of the solvent, time of reaction, and temperature of reaction. Typically, the degree of conversion can range from about 10% to about 95%. However, in certain embodiments, the conversion is typically high (e.g., about 50% or greater, about 60% or greater, about 70% or greater, about 80% or greater, or about 90% or greater).

The average molecular weight of the polymer produced from the substituted 1,3-butadiene will depend in part on the loading of monomer and/or on reaction time. Polymers with relatively high average molecular weights can be produced according to the present invention. For example, in some embodiments, the number average molecular weight ($M_n$) is greater than about 5,000 Da, greater than about 10,000 Da, greater than about 100,000 Da, greater than about 500,000 Da, or greater than about 1,000,000 Da. In certain embodiments, the $M_n$ is between about 20,000 Da and about 500,000 Da. In certain embodiments, the $M_n$ is between about 500,000 Da and about 1,000,000 Da.

The distribution of molecular weights within a given sample of polymer produced according to the present invention can vary. In some cases, it may be desirable to produce polymers having a narrow molecular weight distribution (i.e., the ratio of the weight-average molecular weight to the number-average molecular weight, also referred to as the polydispersity index, or PDI, is close to 1). Although for many applications, it is not necessary to have a great degree of control over the molecular weight distribution within the polymer sample, in certain embodiments, it may be desirable to provide a polymer having a low PDI. For example, a polymer of the present invention can have a PDI less than about 1.8, less than about 1.5, less than about 1.3, less than about 1.2, or less than about 1.1. Such polymers are typically prepared via so-called "living" polymerization methods, which generally involve somewhat controlled methods of preparation. For example, some degree of control over PDI can be obtained by using a controlled form of radical polymerization (e.g., ATRP, RAFT, or SFRP) or by using coordination polymerization (e.g., with Ziegler-Natta catalysts), as described above.

The architecture of a polymer produced according to the present invention can vary. For example, in certain embodiments, a linear substituted polybutadiene is provided. For example, a linear polymer of the structure shown below can be prepared from neophytadiene, wherein n is an integer representing the number of monomer units and is typically greater than about 10, greater than about 20, greater than about 50, greater than about 75, greater than about 100, greater than about 250, greater than about 500, greater than about 750, greater than about 1,000, or greater than about 2,000. In certain embodiments, n is, for example, about 2 to about 3,000 or about 10 to about 1,500.

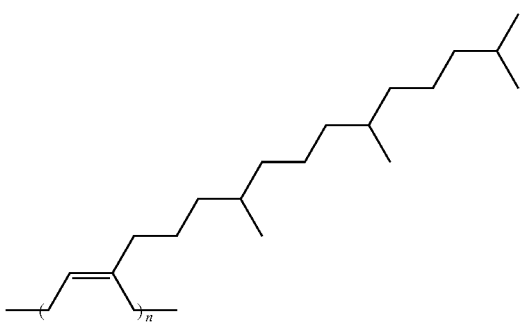

Other architectures including, but not limited to, branched polymers (e.g., star polymers, comb polymers, brush polymers, dendrimers, and ladders), and/or ring polymers are also possible.

The stereochemistry (i.e., the percentages of cis and trans double bonds) of a polymer produced according to the present invention can vary. As noted above, the percentages of cis and trans bonds can be controlled to some extent by temperature and catalyst selection and by concentration of reagents. In some embodiments, a polymer according to the present invention comprises primarily cis 1,4-linkages, for example, greater than about 60%, greater than about 70%, greater than about 80%, greater than about 90%, or greater than about 95% cis 1,4-linkages. In some embodiments, a polymer according to the present invention comprises primarily trans 1,4-linkages, for example, greater than about 60%, greater than about 70%, greater than about 80%, greater than about 90%, or greater than about 95% trans 1,4-linkages. In some embodiments, a polymer according to the present invention has roughly equal percentages of cis and trans 1,4-linkages. The stereochemistry of the polymer can affect the degree of crystallinity. Generally, a polymer having a high percentage of trans 1,4-linkages has a higher degree of crystallinity than a polymer having a high percentage of cis 1,4-linkages. Thus, polymers according to the present invention can have varying levels of crystallinity, from about 0% (completely amorphous) to about 95% (predominantly crystalline).

According to the present invention, polymers that incorporate substituted 1,3-butadiene monomers and one or more additional components in the backbone are also provided. For example, PCT WO94/12450 to De Graaf et al., which is incorporated herein by reference, describes a polymer with a sulfur-containing backbone, prepared from neo-, cis-, and trans-1,3-phytadiene, reacted in the presence of sulfur-containing reagents. Various other components may be incorporated into the backbone of polymers prepared from substituted 1,3-butadienes according to the present invention.

Copolymers prepared from a substituted 1,3-butadiene and one or more additional monomers are also provided according to the present invention. Reference to "polymers of the present invention" is intended to encompass: homopolymers prepared from substituted 1,3-butadienes; polymers prepared from substituted 1,3-butadienes and one or more additional reagents; copolymers prepared from substituted 1,3-butadienes and one or more additional monomers; treated (e.g., cross-linked) polymers and copolymers; and blends of such polymers and copolymers.

Copolymers can have any type of monomer arrangement and in some embodiments can be alternating copolymers (having regularly alternating monomers), periodic copolymers (having monomers arranged in some repeating sequence), statistical copolymers (having monomers arranged according to a known statistical rule, including random copolymers), block copolymers (having two or more homopolymer subunits linked by covalent bonds, e.g., diblock copolymers, triblock copolymers, etc.), and/or graft or grafted copolymers (having side chains with a different composition than the main chain).

The one or more additional monomers incorporated within a copolymer of the present invention can be of any type. They can be natural or synthetic. The additional monomers can be chosen to modify the properties of a polymer based on a substituted 1,3-diene by introducing some desired functionality (e.g., increasing or reducing crystallinity, modifying the glass transition temperature, and/or modifying the solubility). In some embodiments, the additional monomers are alkenes and/or dienes. In some embodiments, copolymers can comprise, in addition to a component based on substituted 1,3-butadiene monomers, one or more components based on the following monomers: ethylene, propylene, isobutylene, but-1-ene, pent-1-ene, hex-1-ene and oct-1-ene, butadiene, isoprene, chloroprene, penta-1,3-diene, 2,3-dimethylbutadiene, penta-1,4-diene, hexa-1,5-diene, vinylcyclohexene, styrene, acrylonitrile, acrylate, methyl methacrylate, ethyl acrylate, ethylene oxide (or ethylene glycol), caprolactone, and lactide. In some preferred embodiments, the invention provides for copolymers prepared from substituted 1,3-butadiene and styrene, butadiene, isoprene, and/or acrylonitrile. In certain embodiments, copolymers according to the present invention comprise poly(substituted 1,3-diene) and one or more of polyurethane, nylon, poly(ethylene terephthalate), polycarbonate, poly(vinyl chloride), and poly(tetrafluoro ethylene).

The means by which copolymers can be produced can vary. Any reagents and conditions suitable for the polymerization of the desired monomers can be used. For example, to prepare random copolymers, multiple monomer types can be combined together under suitable conditions to ensure incorporation of all monomer types into the propagating chain. To prepare block copolymers, polymer A can be polymerized, followed by polymerization of polymer B from the chain end of polymer A. A block copolymer typically comprises two or more "blocks" of different polymer types. Similar or different polymerization mechanisms can be used for preparation of the different components, but typically, controlled (living) polymerization methods are required. In certain embodiments, the chain end of polymer A remains active after polymer A is prepared, and a suitable monomer can then be added to the reaction mixture to form polymer B. In certain embodiments, the chain end of polymer A may have to be functionalized to provide an initiating site for the polymerization of polymer B. For example, polymers A and B can both be prepared via anionic polymerization or polymer A can be prepared via radical polymerization and polymer B can be prepared by ring-opening polymerization. In some embodiments, polymer A and polymer B can be separately prepared and later reacted to covalently bond the polymers together, producing a block copolymer. Other types of copolymers comprising a substituted 1,3-butadiene can be prepared according to standard procedures.

A polymer produced according to the present invention can be used directly or can be treated in some way prior to use. For example, the polymer can be blended with one or more other types of polymers to alter its properties. In some embodiments, the polymer can be blended with at least one rubber, selected from natural rubber and synthetic rubbers. In some embodiments, the polymer can be hydrogenated. In some embodiments, one or more additives are introduced into the polymer sample to alter its properties (e.g., antioxidants, compounding additives, processing aids, plasticizers, and/or resins).

In some embodiments, the polymer can be cross-linked prior to use. Cross-linking refers to any means by which one or more polymer chains are linked to one another (e.g., via covalent or ionic bonding). The number, length, and strength of the cross-links can vary. Cross-linking can be accomplished by addition of one or more appropriate reagents and/or by physical treatment (e.g., treating the polymer with heat and/or radiation). One specific type of cross-linking that may be applicable herein is vulcanization. Vulcanization is a cross-linking method that typically employs sulfur-based reagents, peroxide-based reagents, azo compounds, urethanes, and/or metallic oxides. Some specific examples of reagents (vulcanizing agents, also termed "curing agents") that can effectuate vulcanization of olefinic polymers are described, for example, in U.S. Pat. Nos. 2,477,015 and 2,567,135 to Sturgis et al.; U.S. Pat. No. 4,873,291 to Cohen et al.; and U.S. Pat. No. 6,245,861 to Class, which are all incorporated herein by reference. Other exemplary reagents that can be used for vulcanization include those described in Kirk-Othmer, Encyclopedia of Chemical Technology, $3^{rd}$ Ed., Wiley Interscience, N.Y. (1982) 20: 365-468, which is incorporated herein by reference. In certain embodiments, the substituted 1,3-butadiene can be co-cured with other double bond-containing polymers.

The properties of the polymer produced from a substituted 1,3-butadiene can vary widely depending on multiple variables, including but not limited to, the selection and concentration of monomer, initiator, and catalyst; the selection of reaction conditions (e.g., temperature and reaction time); the length and architecture of the resulting polymer, and any post-synthesis treatment performed on the polymer. For example, increases in length, branching, and/or cross-linking tend to increase the strength of a polymer and increase its glass transition temperature.

In certain embodiments, the polymers of the present invention display rubber-like properties. In some embodiments, the polymers of the present invention may display significantly different physical properties compared to those of unsubstituted 1,3-butadiene. For example, in some embodiments, the presence of branches (i.e., the $R_1$ or $R_2$ substituent) along the backbone of a polymer can result in increased polymer strength, toughness, and glass transition temperature.

The polymers produced according to the present invention may be useful in a range of industries and for a variety of applications. In some embodiments, a polymer according to the present invention may be used as a component of a composition that finds use in a tobacco product or in packaging for such products.

For example, in some embodiments, such polymers can be used as components of tobacco compositions, particularly tobacco compositions incorporated into smoking articles or smokeless tobacco products. In accordance with the present invention, a tobacco product can incorporate tobacco that is combined with a tobacco-derived polymer according to the invention. That is, a portion of the tobacco product can be comprised of some form of polymer prepared according to the invention. For example, the polymer may be used as a binder or filler or component thereof in a tobacco composition adapted for use in a smoking article or smokeless tobacco product. In some embodiments, the polymer may be used as a stiffening agent. A stiffening agent can be used, for example, to improve filling capacity or firmness of a tobacco composition.

Exemplary types of smokeless tobacco compositions to which the polymer of the invention can be added include loose moist snuff (e.g., snus), loose dry snuff, chewing tobacco, pelletized tobacco pieces (e.g., having the shapes of pills, tablets, spheres, coins, beads, obloids or beans), extruded or formed tobacco strips, pieces, rods, cylinders or sticks, finely divided ground powders, finely divided or milled agglomerates of powdered pieces and components, flake-like pieces, molded processed tobacco pieces, pieces of tobacco-containing gum, rolls of tape-like films, readily water-dissolvable or water-dispersible films or strips (e.g., US Pat. App. Publ. No. 2006/0198873 to Chan et al., which is incorporated herein by reference), or capsule-like materials possessing an outer shell (e.g., a pliable or hard outer shell that can be clear, colorless, translucent or highly colored in nature) and an inner region possessing tobacco or tobacco flavor (e.g., a Newtonian fluid or a thixotropic fluid incorporating tobacco of some form). In certain embodiments, a polymer of the invention can be used as a porous matrix material that incorporates a tobacco composition therein for oral enjoyment. Various types of smokeless tobacco products into which the polymers of the invention could be incorporated are set forth in U.S. Pat. No. 1,376,586 to Schwartz; U.S. Pat. No. 3,696,917 to Levi; U.S. Pat. No. 4,513,756 to Pittman et al.; U.S. Pat. No. 4,528,993 to Sensabaugh, Jr. et al.; U.S. Pat. No. 4,624,269 to Story et al.; U.S. Pat. No. 4,987,907 to Townsend; U.S. Pat. No. 5,092,352 to Sprinkle, III et al.; U.S. Pat. No. 5,387,416 to White et al.; U.S. Pat. No. 6,668,839 to Williams; and U.S. Pat. No. 6,845,777 to Pera; US Pat. App. Pub. Nos. 2005/0244521 to Strickland et al. and 2008/0196730 to Engstrom et al.; PCT WO 04/095959 to Arnarp et al.; PCT WO 05/063060 to Atchley et al.; PCT WO 05/016036 to Bjorkholm; and PCT WO 05/041699 to Quinter et al., each of which is incorporated herein by reference. See also, the types of smokeless tobacco formulations, ingredients, and processing methodologies that could be combined with the polymers of the invention set forth in U.S. Pat. Nos. 6,953,040 and 7,032,601 to Atchley et al.; and U.S. Pat. No. 7,819,124 to Strickland et al.; US Pat. Appl. Pub. Nos. 2002/0162562 to Williams; 2002/0162563 to Williams; 2003/0070687 to Atchley et al.; 2004/0020503 to Williams, 2005/0178398 to Breslin et al.; 2006/0191548 to Strickland et al.; 2007/0062549 to Holton, Jr. et al.; 2007/0186941 to Holton, Jr. et al.; U.S. Pat. No. 7,819,124 to Strickland et al.; 2008/0029110 to Dube et al.; 2008/0029116 to Robinson et al.; 2008/0029117 to Mua et al.; 2008/0149121 to Wrenn et al.; 2008/0173317 to Robinson et al.; 2008/0209586 to Neilsen et al.; 2009/0095313 to Fuisz; 2010/0018541 to Gerardi et al.; 2010/0018540 to Doolittle et al.; 2010/0116281 to Marshall et al.; and 2010/0163062 to Atchley et al., each of which is incorporated herein by reference.

In some embodiments, the polymer may be useful for encapsulating material within a smoking article or smokeless tobacco product. For example, the polymer may be used as an exterior component of a flavorant capsule (e.g., as a capsule wall component) as described in US Pat. Appl. Pub. No. 2009/0277465 to Jupe et al., which is incorporated herein by reference. See also the capsule technologies, including breakable capsule technology, which could be combined with the polymers of the invention set forth in U.S. Pat. No. 3,550,598 to McGlumphy; U.S. Pat. No. 3,575,180 to Carty; U.S. Pat. No. 4,865,056 to Tamaoki et al.; U.S. Pat. No. 4,889,144 to Tateno et al.; U.S. Pat. No. 5,004,595 to Cherukuri et al.; U.S. Pat. No. 5,186,185 to Mashiko et al.; U.S. Pat. No. 5,331,981 to Tamaoki et al.; U.S. Pat. No. 5,690,990 to Bonner; U.S. Pat. No. 5,724,997 to Smith et al.; U.S. Pat. No. 5,759,599 to Wampler et al.; U.S. Pat. No. 6,039,901 to Soper et al.; U.S.

Pat. No. 6,045,835 to Soper et al.; U.S. Pat. No. 6,056,992 to Lew; U.S. Pat. No. 6,106,875 to Soper et al.; U.S. Pat. No. 6,117,455 to Takada et al.; U.S. Pat. No. 6,325,859 to DeRoos et al.; U.S. Pat. No. 6,482,433 to DeRoos et al.; U.S. Pat. No. 6,612,429 to Dennen; U.S. Pat. No. 6,929,814 to Bouwmeesters et al.; U.S. Pat. No. 7,249,605 to McAdam et al.; and U.S. Pat. No. 7,578,298 to Karles et al.; US Pat. Appl. Pub. Nos. 2004/0261807 to Dube et al.; 2006/0112964 to Jupe et al.; 2007/0012327 to Karles et al.; 2007/0062549 to Holton, Jr. et al.; 2007/0095357 to Besso et al.; 2007/0186941 to Holton, Jr. et al.; 2008/0029110 to Dube et al.; 2008/0156336 to Wyss-Peters et al.; 2009/0038628 to Shen et al.; and 2009/0050163 to Hartmann et al.; and PCT WO 03/009711 to Kim; each of which is incorporated herein by reference.

In some embodiments, the polymer may be chemically derivatized to provide various pendant groups. For example, the polymer may be derivatized to attach one or more flavor groups, as taught, for example, in U.S. Pat. No. 4,206,301 to Yolles, which is incorporated herein by reference.

In certain embodiments, the polymer may be incorporated into a filter for a smoking article. For example, the polymer may be processed to produce fibers useful as tow material in the filter or the polymer may be applied to tow material (e.g., as a binding agent). The use of polymers in filters is described, for example, in U.S. Pat. No. 2,780,228 to Touey; U.S. Pat. No. 2,966,157 to Touey et al.; U.S. Pat. No. 3,144,025 to Erlich; U.S. Pat. No. 3,393,120 to Touey; U.S. Pat. No. 3,878,853 to Lipson et al.; U.S. Pat. No. 3,880,173 to Hill; U.S. Pat. No. 4,261,373 to Tamaoki et al.; U.S. Pat. No. 4,579,130 to Coffman; U.S. Pat. No. 5,025,815 to Hill et al.; U.S. Pat. No. 5,063,945 to Sugihara et al.; and U.S. Pat. No. 5,817,159 to Cahill et al., which are all incorporated herein by reference. In some embodiments, the polymer may be used as a substrate for adsorbed flavorant in the filter, as disclosed in U.S. Pat. No. 4,729,391 to Woods et al., which is incorporated herein by reference.

In some embodiments, the polymer may be used in the tipping paper of a smoking article, for example, as an exterior coating or internal paper ingredient to alter the lip release properties of the smoking article. The use of polymers for such purposes is described, for example, in U.S. Pat. No. 5,595,196 to Salonen et al. and US Pat. Appl. Pub. No. 2010/0108084 to Norman et al., which are incorporated herein by reference. In some embodiments, the polymer may be used as a component of a multi-layer composition, for example, as a barrier material.

In some embodiments, the polymer may be used as an adhesive component. The adhesive may be used within a smoking article (e.g., as a sideseam adhesive to secure cigarette paper around the tobacco rod or as a filter adhesive to secure the plug wrap to the filter and/or the filter to the tobacco rod in a smoking article).

The polymer may be used as a pigment to alter the color of one or more component of a tobacco product. In some embodiments, it may be used as a component of a monogram ink or may be used as a component of a colorant used in various components (e.g., to color the tipping paper of a smoking article).

In certain embodiments, the polymer may be used in a degradable pouch to contain smokeless tobacco, adapted for oral administration. For example, a polymer according to the present invention may be combined, in copolymer form, or in a blend or mixture, with one or more polymers having hydrolyzable bonds (e.g., including but not limited to, polyanhydrides, polyesters, polycarbonates, polyorthoesters, polyphosphazenes, polyesterurethanes, polycarbonateurethanes, and polyaminoacids) to allow for degradation in the mouth of the user. See, for example, US Pat. Appl. Pub. No. 2008/0302682 to Engstrom et al., which is incorporated herein by reference.

A polymer of the present invention may also be incorporated within a composition suitable for oral nicotine delivery that is not designed to be degradable. For example, in certain embodiments, the polymer may be included in a water-insoluble composition that is a substitute for chewing tobacco. See, for example, U.S. Pat. No. 4,907,605 to Ray et al., which is incorporated herein by reference. In certain embodiments, the polymer may be incorporated into a chewing gum, for example, as a component of the gum base (e.g., as an elastomer). In some embodiments, the polymer is incorporated into a nicotine-containing gum. See, for example, US Pat. Appl. Pub. No. 2008/0124283 and 2009/0196834 to Andersen et al. and 2010/074987 to Neergaard, which are incorporated herein by reference. The polymer of the invention could be incorporated into a wide variety of other oral nicotine products (e.g., sheets, tablets, lozenges, or capsules).

In certain embodiments, the polymer is used to produce an oral nicotine dispenser for non-pyrolytic use (e.g., an electronic cigarette). See, for example, U.S. Pat. No. 7,832,410 to Hon, which is incorporated herein by reference, for exemplary components within an electronic cigarette that may comprise a polymeric material. In certain embodiments, the polymer may be used within the body of an electronic cigarette, or within a combustible fuel element of an electronic cigarette. In some embodiments, the polymer may be used as a component of a porous plug in a nicotine dispenser for non-pyrolytic use, such as described in U.S. Pat. No. 4,800,903 to Ray et al., which is incorporated herein by reference. Additional exemplary references that describe smoking articles of a type that generate flavored vapor, visible aerosol, or a mixture of flavored vapor and visible aerosol, include U.S. Pat. Nos. 3,258,015 and 3,356,094 to Ellis et al.; U.S. Pat. No. 3,516,417 to Moses; U.S. Pat. No. 4,347,855 to Lanzellotti et al.; U.S. Pat. No. 4,340,072 to Bolt et al.; U.S. Pat. No. 4,391,285 to Burnett et al.; U.S. Pat. No. 4,917,121 to Riehl et al.; U.S. Pat. No. 4,924,886 to Litzinger; U.S. Pat. No. 5,060,676 to Hearn et al.; and U.S. Pat. No. 7,726,320 to Robinson et al., all of which are incorporated by reference herein. Many of these types of smoking articles employ a combustible fuel source that is burned to provide an aerosol and/or to heat an aerosol-forming material, and which could be modified by inclusion of a polymer of the invention. See, for example, U.S. Pat. No. 4,756,318 to Clearman et al.; U.S. Pat. No. 4,714,082 to Banerjee et al.; U.S. Pat. No. 4,771,795 to White et al.; U.S. Pat. No. 4,793,365 to Sensabaugh et al.; U.S. Pat. No. 4,917,128 to Clearman et al.; U.S. Pat. No. 4,961,438 to Korte; U.S. Pat. No. 4,966,171 to Serrano et al.; U.S. Pat. No. 4,969,476 to Bale et al.; U.S. Pat. No. 4,991,606 to Serrano et al.; U.S. Pat. No. 5,020,548 to Farrier et al.; U.S. Pat. No. 5,033,483 to Clearman et al.; U.S. Pat. No. 5,040,551 to Schlatter et al.; U.S. Pat. No. 5,050,621 to Creighton et al.; U.S. Pat. No. 5,065,776 to Lawson; U.S. Pat. No. 5,076,296 to Nystrom et al.; U.S. Pat. No. 5,076,297 to Farrier et al.; U.S. Pat. No. 5,099,861 to Clearman et al.; U.S. Pat. No. 5,105,835 to Drewett et al.; U.S. Pat. No. 5,105,837 to Barnes et al.; U.S. Pat. No. 5,115,820 to Hauser et al.; U.S. Pat. No. 5,148,821 to Best et al.; U.S. Pat. No. 5,159,940 to Hayward et al.; U.S. Pat. No. 5,178,167 to Riggs et al.; U.S. Pat. No. 5,183,062 to Clearman et al.; U.S. Pat. No. 5,211,684 to Shannon et al.; U.S. Pat. No. 5,240,014 to Deevi et al.; U.S. Pat. No. 5,240,016 to Nichols et al.; U.S. Pat. No. 5,345,955 to Clearman et al.; U.S. Pat. No. 5,551,451 to Riggs et al.; U.S. Pat. No. 5,595,577 to Bensalem et al.; U.S. Pat. No. 5,819,751 to Barnes et al.; U.S. Pat. No. 6,089,857 to Matsuura et al.; U.S. Pat. No. 6,095,152 to Beven et al; U.S. Pat. No. 6,578,584 to Beven; and U.S. Pat. No. 6,730,832 to Dominguez; which are incorporated herein by reference.

In some embodiments, the polymer may be used as a packaging component. For example, in certain embodiments, the polymer may be used to produce a pouch to store nicotine, such as that disclosed in U.S. Pat. No. 5,268,209 to Hunt et al., which is incorporated herein by reference. It may be used as a film or overwrap for packaging. In certain embodiments, the polymer may be used in a packaging laminate, such as that disclosed in U.S. Pat. No. 4,784,885 to Carespodi, which is incorporated herein by reference. In other embodiments, the polymer may be used in various types of containers, films, wrappings, and package/container seals. For example, it may be used as a component of injection-molded packaging to contain tobacco products (e.g., snus cans and dissolvable packs). In certain embodiments, the polymer may be useful as a texturing agent for boards and/or packaging materials. See, for example, the various types of containers for smokeless types of products that could be modified by inclusion of a polymer of the invention set forth in U.S. Pat. No. 7,014,039 to Henson et al.; U.S. Pat. No. 7,537,110 to Kutsch et al.; U.S. Pat. No. 7,584,843 to Kutsch et al.; U.S. Pat. No. D592,956 to Thiellier and U.S. Pat. No. D594,154 to Patel et al.; US Pat. Publ. Nos. 2008/0173317 to Robinson et al.; 2009/0014343 to Clark et al.; 2009/0014450 to Bjorkholm; 2009/0250360 to Bellamah et al.; 2009/0266837 to Gelardi et al.; 2009/0223989 to Gelardi; 2009/0230003 to Thiellier; 2010/0084424 to Gelardi; and 2010/0133140 to Bailey et al; and U.S. patent application Ser. No. 29/342,212, filed Aug. 20, 2009, to Bailey et al.; Ser. No. 12/425,180, filed Apr. 16, 2009, to Bailey et al.; Ser. No. 12/685,819, filed Jan. 12, 2010, to Bailey et al.; and Ser. No. 12/814,015, filed Jun. 11, 2010, to Gelardi et al., which are all incorporated herein by reference.

Referring to FIG. 1, there is shown a smoking article 10 in the form of a cigarette that could include a polymer of the present invention as described herein. The cigarette 10 includes a generally cylindrical rod 12 of a charge or roll of smokable filler material (e.g., about 0.3 to about 1.0 g of smokable filler material such as tobacco material) contained in a circumscribing wrapping material 16. The rod 12 is conventionally referred to as a "tobacco rod." The ends of the tobacco rod 12 are open to expose the smokable filler material. The cigarette 10 is shown as having one optional band 22 (e.g., a printed coating including a film-forming agent, such as starch, ethylcellulose, or sodium alginate) applied to the wrapping material 16, and that band circumscribes the cigarette rod in a direction transverse to the longitudinal axis of the cigarette. The band 22 can be printed on the inner surface of the wrapping material (i.e., facing the smokable filler material), or less preferably, on the outer surface of the wrapping material.

At one end of the tobacco rod 12 is the lighting end 18, and at the mouth end 20 is positioned a filter element 26. The filter element 26 positioned adjacent one end of the tobacco rod 12 such that the filter element and tobacco rod are axially aligned in an end-to-end relationship, preferably abutting one another. Filter element 26 may have a generally cylindrical shape, and the diameter thereof may be essentially equal to the diameter of the tobacco rod. The ends of the filter element 26 permit the passage of air and smoke therethrough. A plug wrap 28 enwraps the filter element and a tipping material (not shown) enwraps the plug wrap and a portion of the outer wrapping material 16 of the rod 12, thereby securing the rod to the filter element 26.

A ventilated or air diluted smoking article can be provided with an optional air dilution means, such as a series of perforations 30, each of which extend through the tipping material and plug wrap. The optional perforations 30 can be made by various techniques known to those of ordinary skill in the art, such as laser perforation techniques. Alternatively, so-called off-line air dilution techniques can be used (e.g., through the use of porous paper plug wrap and pre-perforated tipping paper).

Figure 2:
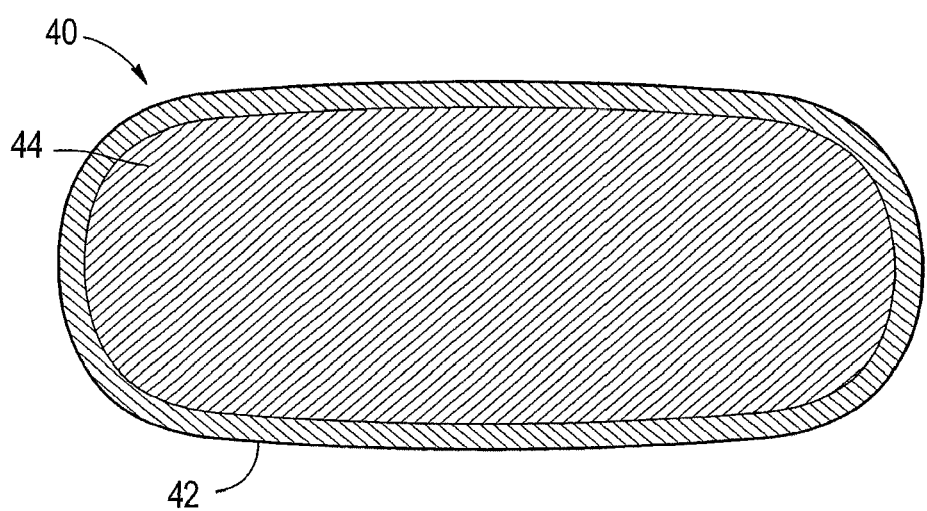
FIG. 2 is a cross-sectional view of a smokeless tobacco product embodiment, taken across the width of the product, showing an outer pouch filled with a smokeless tobacco composition.

Referring to FIG. 2, a representative snus type of tobacco product that could incorporate a polymer of the present invention as described herein. In particular, FIG. 2 illustrates a smokeless tobacco product 40 having a water-permeable outer pouch 42 containing a smokeless tobacco composition 44, wherein the tobacco composition, or the pouch, or the container housing the tobacco product (not shown) includes a polymer of the invention.

In addition to finding use in various applications related to tobacco products, the polymers of the present invention may be useful in a range of other industries. For example, polymers of the present invention may be used in any application for which polybutadiene, functionalized/derivatized (e.g., cross-linked) polybutadiene, copolymers comprising polybutadiene and/or blends comprising polybutadiene are used.

For example, the polymers may be used in such products as tires (treads, sidewalls, and inner tubes), conveyor belts, tools, sealants, bearing components, skids, storage cans, hoses, gloves, erasers, golf balls, soles of shoes, coatings for electronic assemblies, water seals, floor tiles and other floor coverings, and cosmetic components. See U.S. Pat. No. 3,900,456 to Naylor et al.; U.S. Pat. No. 4,076,255 to Moore et al.; U.S. Pat. No. 4,111,499 to McCloskey; U.S. Pat. No. 4,955,613 to Gendreau et al.; and U.S. Pat. No. 6,291,374 to Landi, which are incorporated herein by reference. In some embodiments, the polymers may be useful in adhesives, resins, molded materials, asphalt binding materials, and rocket fuel. For examples of these and other applications, see U.S. Pat. No. 3,741,927 to Takeuchi et al.; U.S. Pat. No. 3,992,561 to Hargis et al.; U.S. Pat. No. 4,795,778 to Bond et al.; U.S. Pat. No. 4,904,725 to Himes; U.S. Pat. No. 4,931,376 to Ikematsu et al.; U.S. Pat. No. 4,976,961 to Norbury et al.; U.S. Pat. No. 5,540,983 to Maris et al.; U.S. Pat. No. 6,486,258 to Noguchi et al.; U.S. Pat. No. 7,799,725 to Suzuki et al.; and U.S. Pat. No. 7,846,461 to Hwang et al., which are all incorporated herein by reference.

EXPERIMENTAL

The present invention is more fully illustrated by the following examples, which are set forth to illustrate certain aspects of the present invention and are not to be construed as limiting thereof.

Example 1

Isolation of Essential Oil Comprising Neophytadiene

A mixture of flue-cured, burley, and oriental tobaccos is subjected to a dry steam distillation. Specifically, a strip blend of flue cured, burley, and oriental tobaccos is placed in a 640 ft$^3$ wagon equipped with steam distillation capability. Anhydrous steam is passed through the wagon and condensed, producing approximately 4 gallons per minute of steam distillate. The distillate is processed employing equipment traditionally employed for the isolation of peppermint oils. A few minutes after beginning the steam distillation process, an oil sheen begins to appear on the surface of the collected distillate. As time progresses, the sheen becomes a defined oil layer resting on top of the water condensate. This reddish-brown essential oil is gently removed from the water.

The essential oil is dissolved in methylene chloride and analyzed by gas chromatography/mass spectrometry (GC/MS, e.g., Agilent 6890 GC equipped with Agilent 5973 MSD). Data indicates that the essential oil comprises, as major volatile and semi-volatile compounds, solanone, neophytadiene, palmitic acid, and oleic acid. Other components of the essential oil are megastigmatrienone isomers, ionol derivatives, O-damascenone, and norsolanadione.

Further, the distillate water that was first passed through the essential oil isolation equipment and subsequently exhausted to the sewer (i.e., the "waste" stream) is captured. Samples of the "waste" stream collected during the distillation as a function of time are dissolved in methylene chloride and analyzed by GC/MS. The resulting chromatograms indicate that the "waste" stream contains a notable number of volatile and semi-volatile compounds including some of the compounds found in the essential oil (e.g., neophytadiene, nicotine, furfuryl alcohol, and bipyridine).

The "waste" stream is separated into aqueous and organic components to facilitate downstream processing/separation of the essential oil into less complex mixtures or individual components. Specifically, "waste" water from the steam distillation process is added to silica contained within a fitted glass cylinder. The water is gently removed from the silica using a water aspirator vacuum. Hexane is percolated through the column, followed by MTBE, followed by methanol. The organic solvents are removed by rotary evaporation and the resulting materials are reconstituted in methylene chloride. The methylene chloride samples are analyzed by GC/MS. The major component of the hexane extract is neophytadiene.

Example 2

Polymerization of Neophytadiene Via Anionic Polymerization

A polymerization reactor is thoroughly purged with nitrogen and charged with hexanes and n-butyllithium. Neophytadiene is added. The resultant reaction mixture is stirred at about 60° C. under nitrogen to about 80% monomer conversion (as determined via gel permeation chromatography, GPC). Methanol is added to terminate the reaction. The polymer product is precipitated, washed, and dried under vacuum.

The polymer is analyzed by GPC to determine molecular weight and PDI. Infrared spectroscopy is used to determine the cis/trans content of the polymer. The glass transition temperature and/or melting point is determined via differential scanning calorimetry. The cis/trans content and the percentage of 1,2- and 1,4-linkages in the polymer is determined by infrared spectroscopy.

Example 3

Polymerization of Neophytadiene Via Coordination Polymerization

A polymerization reactor is thoroughly purged with nitrogen and charged with triethyl aluminum in hexanes. To the solution is added titanium tetrachloride, producing a precipitate. Neophytadiene is added as a solution in hexanes, and the reactor is sealed and stirred at 50° C. for 24 hours. The polymeric product is precipitated in isopropyl alcohol, washed, and dried under vacuum.

The polymer is analyzed by GPC to determine molecular weight and PDI. Infrared spectroscopy is used to determine the cis/trans content of the polymer. The glass transition temperature and/or melting point is determined via differential scanning calorimetry. The cis/trans content and the percentage of 1,2- and 1,4-linkages in the polymer is determined by infrared spectroscopy.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A polymer prepared from neophytadiene derived from a plant of the *Nicotiana* species.
2. The polymer of claim 1, wherein the polymer comprises greater than about 60% cis 1,4-linkages.
3. The polymer of claim 2, wherein the polymer comprises greater than about 80% cis 1,4-linkages.
4. The polymer of claim 1, wherein the polymer comprises greater than about 60% trans 1,4-linkages.
5. The polymer of claim 3, wherein the polymer comprises greater than about 80% trans 1,4-linkages.
6. The polymer of claim 1, wherein the polymer has a $M_n$ of between about 20,000 Da and about 500,000 Da.
7. The polymer of claim 1, wherein the polydispersity index of the polymer is less than about 1.5.
8. A tobacco product comprising a polymer prepared from neophytadiene derived from a plant of the *Nicotiana* species.
9. The tobacco product of claim 8, wherein the tobacco product is a smoking article or a smokeless tobacco product.
10. The tobacco product of claim 8, wherein the polymer is incorporated into the tobacco product in admixture with a tobacco material.
11. The tobacco product of claim 8, wherein the polymer is incorporated into a pouch surrounding a smokeless tobacco composition.
12. The tobacco product of claim 8, wherein the tobacco product contains a capsule, and the capsule comprises the polymer.
13. The tobacco product of claim 8, wherein the tobacco product comprises one or more wrapping materials, and the polymer is incorporated into, or coated on a surface of, at least one wrapping material.
14. The tobacco product of claim 8, wherein the tobacco product is a filtered cigarette comprising a filter element, and the filter element comprises the polymer.
15. A method of polymerizing neophytadiene derived from a plant of the *Nicotiana* species, comprising reacting neophytadiene derived from a plant of the *Nicotiana* species with one or more reagents selected from the group consisting of an anionic initiator, a radical initiator, and a Ziegler-Natta catalyst.
16. The method of claim 15, wherein the reacting step comprises reacting neophytadiene with one or more anionic initiators.
17. The method of claim 16, wherein the one or more anionic initiators comprises a lithium-based compound.
18. The method of claim 17, wherein the lithium-based compound is n-butyl lithium.
19. The method of claim 15, wherein the reacting step comprises reacting neophytadiene with one or more radical initiators.

20. The method of claim 19, wherein the one or more radical initiators comprises a reagent selected from the group consisting of a peroxide, an azo compound, and a persulfate.

21. The method of claim 19, wherein the radical initiator is activated by heat, photolysis, a reduction-oxidation reaction, dissociation, or ionizing radiation.

22. The method of claim 15, wherein the reacting step comprises reacting neophytadiene with a catalyst comprising a Ziegler-Natta catalyst.

23. The method of claim 22, wherein the Ziegler-Natta catalyst comprises a titanium compound and an aluminum compound.

24. The method of claim 23, wherein the titanium compound is titanium (IV) chloride or titanium (III) chloride.

25. The method of claim 23, wherein the aluminum compound is a dialkyl aluminum hydride, a dialkyl aluminum halide, or a trialkyl aluminum compound.

26. The method of claim 25, wherein the aluminum compound is triethylaluminum, diethylaluminum hydride, diethylaluminum chloride, or diisobutylaluminum chloride.

27. The method of claim 15, further comprising cross-linking the polymerized neophytadiene.

28. The method of claim 27, wherein the cross-linking step comprises reacting polymerized neophytadiene with a vulcanizing agent comprising sulfur.

29. The method of claim 15, further comprising the step of isolating an extract containing the neophytadiene from a plant of the *Nicotiana* species.

* * * * *